US008145274B2

(12) United States Patent
Gandhi et al.

(10) Patent No.: US 8,145,274 B2
(45) Date of Patent: Mar. 27, 2012

(54) AUTOMATIC SETTING OF REMINDERS IN TELEPHONY USING SPEECH RECOGNITION

(75) Inventors: Salil P. Gandhi, Pune (IN); Saidas T. Kottawar, Maharashtra (IN); Mike V. Macias, Round Rock, TX (US); Sandip D. Mahajan, Nagpur (IN)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/465,731

(22) Filed: May 14, 2009

(65) Prior Publication Data

US 2010/0291972 A1 Nov. 18, 2010

(51) Int. Cl.
*H04B 1/38* (2006.01)
(52) U.S. Cl. ............. 455/563; 455/456.1; 704/201; 704/231; 704/236; 704/257
(58) Field of Classification Search ............ None
See application file for complete search history.

(56) References Cited

U.S. PATENT DOCUMENTS

| 6,711,543 | B2 | 3/2004 | Cameron |
| 6,961,700 | B2 | 11/2005 | Mitchell et al. |
| 7,394,405 | B2 | 7/2008 | Godden |
| 2002/0040297 | A1* | 4/2002 | Tsiao et al. ............ 704/257 |
| 2006/0217967 | A1* | 9/2006 | Goertzen et al. ......... 704/201 |
| 2008/0114714 | A1 | 5/2008 | Vemuri et al. |
| 2008/0195387 | A1* | 8/2008 | Zigel et al. ............ 704/236 |

OTHER PUBLICATIONS

"reQall for iPhone"; http://www.reqall.com/about/reqall_iphone_native.
"What's happening—Conversa Messenger"; Jennifer Bruer; Interactions, vol. 6, Issue 1 (Jan./Feb. 1999), pp. 7-8.

* cited by examiner

*Primary Examiner* — Charles Appiah
*Assistant Examiner* — Mazda Sabouri
(74) *Attorney, Agent, or Firm* — Yudell Isidore Ng Russell PLLC

(57) ABSTRACT

Systems and methods for automatically setting reminders. A method for automatically setting reminders includes receiving utterances, determining whether the utterances match a stored phrase, and in response to determining that there is a match, automatically setting a reminder in a mobile communication device. Various filters can be applied to determine whether or not to set a reminder. Examples of suitable filters include location, date/time, callee's phone number, etc.

18 Claims, 4 Drawing Sheets

| Sentences | Date/Time |
|---|---|
| I will call you tonight | Current day/10:00 pm |
| I will call you later today | No date/time (timeless) |

| Function | Setting |
|---|---|
| Blacklisted numbers | 512-123-4567; 512-987-6543 |
| location | accept everywhere except home |
| Time/day | accept between 8am-8pm; accept Monday through Saturday |
| external interfaces | Lotus Notes; Outlook |
| Callee phrases/time | "Please remind me to do" Next day; 10:00 pm |
| Keypad used to alert | An auto alert will be set to call user |

FIG. 3

AUTOMATIC SETTING OF REMINDERS IN TELEPHONY USING SPEECH RECOGNITION

BACKGROUND

1. Technical Field

Inventive embodiments of the invention disclosed generally relate to communication systems. More particularly, the invention relates to providing alert functionality in a mobile communications environment.

2. Description of the Related Art

Communications networks and devices for transmitting voice data are well known. In the field of mobile telecommunications, end-user mobile devices (such as cellular telephones) are linked to one another via well known communications network infrastructures. Typically in such systems, a mobile device can receive oral speech as input, which is processed into voice data that is eventually transmitted to another mobile device. Cellular telephones, by way of a specific example of mobile devices, are provided with various functions to enhance user experience. One example of such functionality is the provision of a calendar, along with option to set alerts. As used here, the term "alert" is synonymous with the terms "alarm" and "reminder." Some cellular phones ("cell phone" or "phone") are configured to allow the setting of a reminder, which is frequently associated with some specified future time. When the specified time arrives, the device (in this example, the cell phone) provides an indication alerting of the event, which indication can be a ring, vibration, blinking light, etc.

In the general field of data processing, it is well known to receive oral speech input and to process said input for a variety of purposes. A system that performs such functionality is sometimes referred to as a voice/speech recognition system ("SRS" or "speech recognition technology"). Typically, a SRS accepts oral speech input, processes the speech input into voice data to detect input voice data that matches pre-determined data of interest, and provides the output of the matching operation for further processing or desired actions to be taken by other systems.

The use of SRS in cooperation with telecommunications systems (such as telephony) is well known. For example, it is known for a user to make a cell phone call and interact with a data processing system that uses a SRS. A very specific instance of this is when a user places a call to a banking institution. In such an instance, typically, the banking institution's data processing system is configured to use a SRS to guide the user experience or actions, either completely or only partially, in preparation for a human-to-human interaction. However, a very typical use of cell phones (that is, communication between one user and another user) does not involve use of a SRS.

SUMMARY OF ILLUSTRATIVE EMBODIMENTS

In general, disclosed are systems, methods, and computer programs for automatically setting reminders in a data processing system. In one specific embodiment, the invention concerns a method comprising the steps of receiving utterances via a microphone, determining whether the utterances match a stored phrase, and in response to determining that there is a match, automatically setting a reminder in the data processing system.

Inventive embodiments disclosed here employ mobile telecommunications and speech recognition system (SRS) technologies to provide devices, methods, and/or articles of manufacture embodied in computer program products that facilitate an automatic reminder functionality, which heretofore has been unknown. In some embodiments, such functionality allows configuration of a mobile communications device (such as a cell phone, for example) so that the device automatically (a) recognizes certain utterances and, in response to recognizing an utterance, (b) sets a reminder in the mobile communications device.

In one embodiment, the invention is directed specifically to a wireless communication device having functionality for automatically setting reminders. The wireless communication device includes a processor and a memory coupled to the processor, the memory storing a plurality of phrases. The wireless communication device further includes a microphone in communication with the processor, the microphone configured to receive oral speech input. The wireless communication device preferably includes a speech recognition system configured to detect whether the oral speech input matches at least one of the plurality of phrases. The wireless communication device also includes computer logic, executable in said processor, for automatically setting a reminder in the wireless communication device in response to the speech recognition system detecting at least one match between the oral speech input and at least one of the phrases of the plurality of phrases.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIG. 3 shows exemplary tables that can be used with the wireless communication device of FIG. 2.

DETAILED DESCRIPTION OF ILLUSTRATIVE EMBODIMENTS

Figure 1:
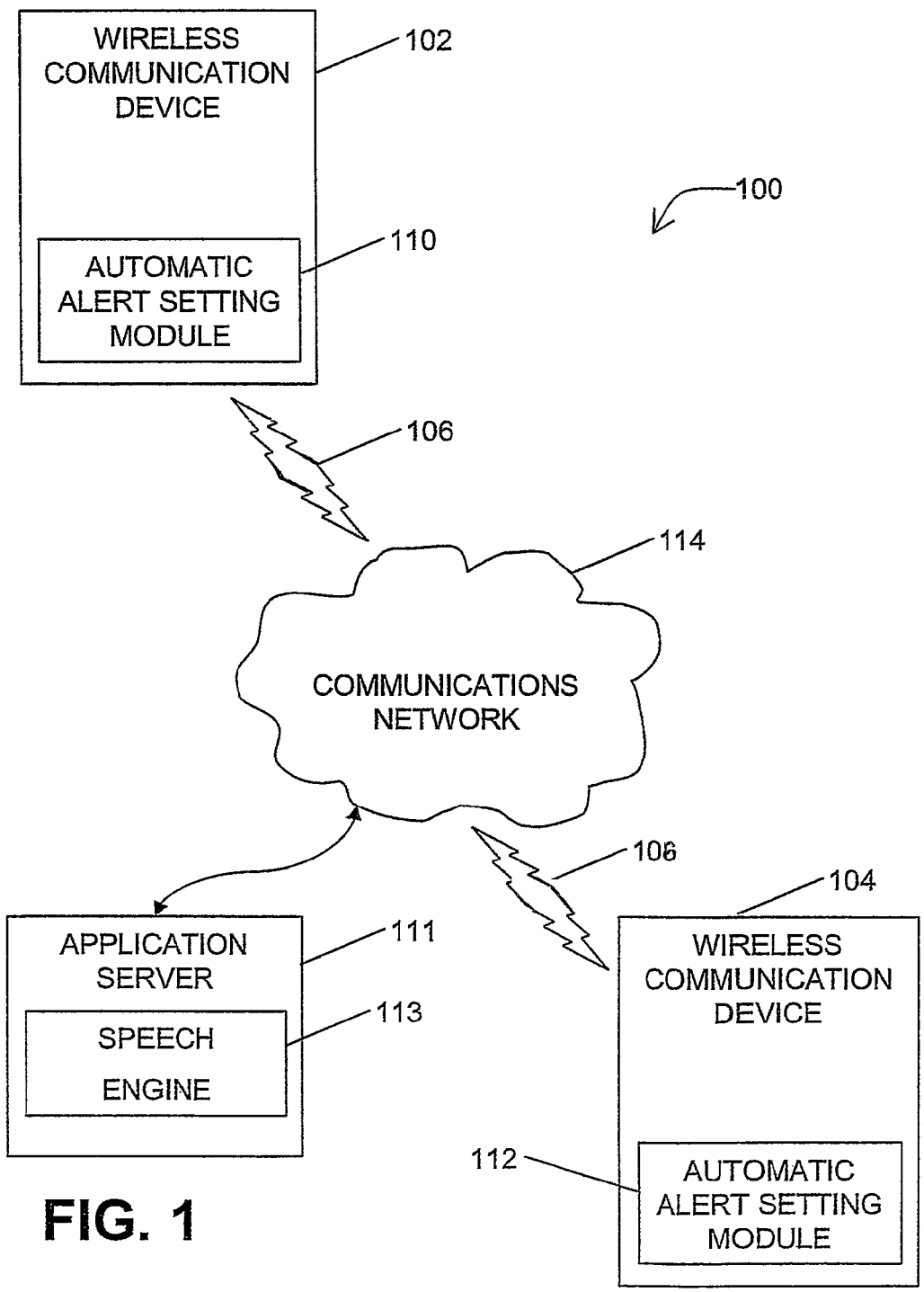
FIG. 1 is a high level schematic diagram of a networked telephony environment configured for use by wireless communication devices having functionality for automatically setting reminders.

In general, the illustrative embodiments provide methods, systems, and articles of manufacture embodied as computer program products for automatically setting reminders in a data processing system in response to received utterances. In one specific embodiment, the invention concerns a method comprising the steps of receiving an utterance via a microphone, determining whether the utterance matches a stored phrase, and in response to determining that there is a match, automatically setting a reminder in a data processing system.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention. It is understood that the use of specific component, device and/or parameter names are exemplary only and not meant to imply any limitations on the invention. The invention may thus be implemented with different nomenclature/terminology used to describe the components, devices, or parameters herein, without limitation. Each term used herein is to be given its broadest interpretation given the context in which that terms is used.

Although embodiments of the invention are described here at times with reference to a cellular telephone network and related devices and techniques, it is to be understood that embodiments of the invention are generally applicable to any communications network and associated devices that are configured to receive oral speech input. As used here, the term "utterance" is synonymous with oral speech. Additionally, as used here the term "phrase" refers one or more words, sounds, or utterances, or any symbolic representation of such one or more words, sounds, or utterances. Although some embodiments of the invention are particularly suited for use in the context of wireless networks and devices, certain embodiments of the invention need not be limited to said context. In one embodiment, for example, the invention is directed to automatically setting reminders in response to a voice recognition system detecting certain predefined matches of utterances. Hence, some embodiments of the invention are applicable to any data processing system configured with a voice recognition system, which data processing system can be a personal voice recorder, personal digital assistant, mobile phone, or computer application (such as a voice-to-text application or a voice-over-internet-protocol application, for example).

While cellular phones having multiple functions are common place today, heretofore no cellular phone technology has provided the functionality of automatically setting renders in response to oral speech provided as input to a cellular phone. For example, during a live phone conversation, a cell phone user ("user") might utter phrases like "I will call you later today," "I will call you tonight," etc, which indicate that the user would like to take a certain action at a later time. Currently, there is no automatic way to set a reminder for the user to take the desired action. Often such conversations ("events") can be forgotten or lost, and the user does not to take the desired action. Embodiments of the invention disclosed here address this problem using, among other things, a speech recognition system ("SRS" or "speech recognition technology").

Certain embodiments of the invention disclosed herein facilitate automatically setting cell phone reminders. In one embodiment of the invention, a SRS monitors in real time a cell phone conversation for key phrases. Utterances in the conversation are compared against a set of pre-determined phrases. In some embodiments, the entire conversation is recorded and the comparison is performed at the end of the conversation against the recorded conversation. If a match is found, a reminder is automatically set according to certain rules. In an alternative embodiment, a SRS command (for example, set_reminder) invokes an automatic reminder setting module.

Certain jurisdictions may not allow the recording of a conversation. Hence, the device can be configured to prevent the recording of a conversation where making such a recording would be illegal. For example, the device can be configured to determine its location (e.g., by use of a global positioning system) and determine whether the conversation recording functionality should be turned on or off based on a list of allowed jurisdictions stored in a memory of the device.

In some embodiments, the device uses filtering rules to either automatically set a reminder or to avoid setting a reminder. For example, one such filter inspects a group of stored cell phone numbers, which can be identified as "white-listed" or "blacklisted" numbers. If the callee's number matches a number in said group, the device sets reminders only for white-listed numbers and does not set reminders for blacklisted numbers. Another filter uses a SRS to detect key phrases in a transmission. For instance, if a transmission contains the phrase "Remind me to do", the system compares this phrase against pre-stored phrases. If a match is found, an automatic reminder is set. Yet another filter involves the location from, and/or time at, which the transmission originates. For instance, if a transmission originates at a caller's location identified as "home," the device can be configured to turn off the automatic setting of reminders. Or, by way of another example, if the time is in a certain range (say, 6 p.m.-6 a.m.), the device can be configured to turn off the automatic setting of reminders. In some embodiments, the time and/or location filters can have precedence over other filters.

The device can be configured to automatically interface with other applications (such as, Notes Calendar, Outlook™, etc.) to replicate the setting of the reminder in those applications. That is, the device automatically sets cell phone reminders—both on the user's cell phone and with the applications it interfaces with, such as Notes Calendar. In one embodiment, a unique, configurable beep can alert the user that an event has been set. Further, the device can be configured to recognize keypad interactions during conversations. For instance, when a user presses *+1 (or simply 1) during a conversation, the system. automatically sets a predetermined reminder. In the event that the user does not hear a expected beep, an override mechanism can allow the user to, for example, use the keypad on the cell phone to record a reminder by pressing a key combination like *+1 (or simply pressing 1).

The device can be configured so customized user settings govern the automatic generation of key events. Certain embodiments of the device allow designation of frequently used key phrases like "I will call you later today," "I will call you tonight," etc., which can be pre-recorded or pre-stored in the device. This can be a one time activity—a configuration or set up step that can be initiated anytime to add and/or modify any phrase. With each designated phrase, a specific date and/or time can be associated. In some embodiments, a phrase is not associated with a date or time (hereinafter a "timeless event"). After the initial setup of all the phrases, the device automatically sets reminders. When a match is found, the device automatically sets a reminder using the date/time (if available) associated with the designated phrase. Otherwise, the reminder is set without a specific date/time ("timeless event"). In one embodiment, a custom override option is used to set a specific date/time, rather than accept the default date/time for a given phrase.

With date/time style alerts, the device provides a notification when a specific reminder is due. The device can provide options to select either "Snooze" or "Done" for these alerts. If "Done" is selected, the reminder can be deleted from the cell phone. Otherwise, the alert is postponed to a later time (per the "Snooze" settings). If the reminder is a timeless event, the reminder can be made available in a fashion similar to a "To Do" list. That is, the user can browse through this list at any time and take appropriate action. A configurable threshold can be used to provide an alert associated with this sort of events. For instance, if the threshold is set to five, an alert is generated once the system contains five timeless events.

Referencing FIG. 1 now, communications system 100 in which embodiments of the invention can be implemented is shown. Communications system 100 includes wireless communication devices 102, 104 configured to be capable of communicating with one another via wireless communication links 106 and communications network 110. In one embodiment, communications system 100 includes application server 111 in communication with at least one of wireless communication devices 102, 104 via communications network 114. Communications network 114 can be a one or more cooperating networks of computers, telephone signals switching stations, satellite links, cellular phone towers, etc., configured to receive, transmit, and deliver signals between or among wireless communication devices 102, 104 and/or application server 111. Application server 111 can be a server computer having suitable computing resources (that is, hardware and software) to provide support for one or more functions of wireless communication devices 102, 104. In one embodiment, for example, application server includes speech engine 113, which is configured to provide speech recognition and/or speech processing services for wireless communication devices 102, 104.

The wireless communication devices 102, 104 can be any devices capable of transmitting and receiving signals wirelessly. In one embodiment, wireless communication devices 102, 104 are mobile telephones, or cellular phones, or radio phones. Preferably, at least one of the communication devices 102, 104 includes automatic alert setting modules 110, 112, which will be described further below.

Figure 2:
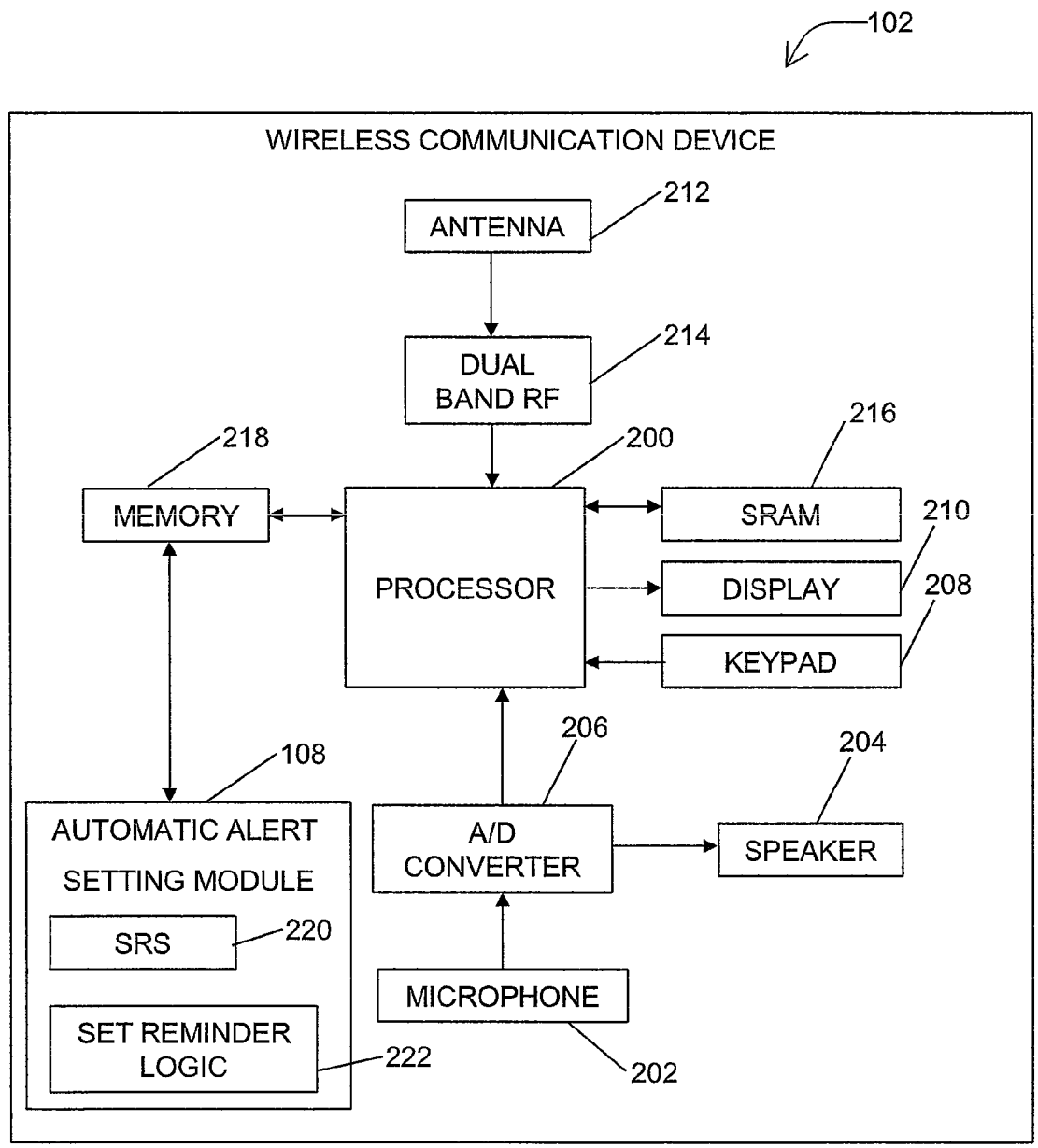
FIG. 2 is a block, schematic diagram of a wireless communication device shown in FIG. 1.

Referencing FIG. 2 now, in one embodiment wireless communication device 102 can include processor 200 adapted to receive voice data via microphone 202 and analog-to-digital converter 206. As used here, "voice data" includes, among other things, oral speech and/or utterances. Microphone 202 is configured to transduce oral speech signals which are processed by analog-to-digital converter 206 before being passed as voice data to processor 200. In some embodiments, the voice data can be stored in memory 218 before being accessed by processor 200. Speaker 204 can be coupled to processor 200 via analog-to-digital converter 206 to produce sound output. Wireless communication device 102 can also include keypad 208 and display 210 both coupled to processor 200. Wireless communication device 102 includes antenna 212 coupled to dual band RF transceiver 214, which dual band RF transceiver 214 is also coupled to processor 200. SRAM 216 and memory 218 are coupled to processor 200. SRAM 216 can be any device providing random access memory functionality. In one embodiment, memory 218 is one of several non-volatile, flash memory devices well known in the relevant technology such as TransFlash (Micro SD, MMC Mobile), Mini SD, MMC, RS-MMC, and Secure Digital cards (SD card). In some embodiments, wireless communication device 102 includes a Subscriber Identity Module card (or SIM card, not shown), which stores data used to identify a subscriber on a mobile telephony device. The SIM card is typically coupled to processor 200.

Wireless communication device 102 as just described above conforms to a general configuration of a mobile telephone, such as a cellular telephone. However, to implement embodiments of the invention described here, wireless communication device 102 need not include all the components just described or be configured in the same manner. For example, in some embodiments, wireless communication device 102 may not include display 210. In yet other embodiments, wireless communication device 102 may use multiple application specific integrated circuits configured to provide some or substantially most of all the processing functionality of processor 200. In the case of satellite phones or radio phones, for example, a wireless communication device may include components that though configured to receive speech input and output sound may not be the same (or even be functionally equivalently to) the components of the exemplary wireless communication device 102 of FIG. 2.

Wireless communication device 102 preferably includes automatic alert setting module ("AASM") 110. Wireless communication device 104 includes AASM 112 which is substantially the same as AASM 110, except for user-specific configurations applicable to a respective AASM 110 and AASM 112. Hence, the following description will reference only AASM 110, but the description is substantially applicable to AASM 112. AASM 110 includes computing logic/instructions embodied in software modules, hardware, or a combination thereof, configured to cooperate with one or more of the other components of wireless communication device 102 described above to provide the functionality of facilitating the automatic setting of reminders in response to the receipt of certain utterances.

In one embodiment, AASM 108 includes speech recognition system (SRS) 220 in communication with set reminder logic 222. SRS 220 can be any of well known speech recognition technologies, which use, among other things, speech recognition engines having vocabularies, grammars, etc. For example, speech recognition software available as open source software includes CMU Sphinx, HTK, Julius, VoxForge; proprietary speech recognition software includes IBM ViaVoice and MacSpeech Dictate. Because a person of ordinary skill in the relevant technology will readily know how to select and use speech recognition technology to provide the desired functionality of SRS 220, no further details of a general implementation of SRS 220 will be provided here. It should be noted that in some embodiments all or part of AASM 108 is located at, or its functionality provided from, application server 111 (shown in FIG. 1). Depending on the availability of computing resources at wireless communication device 102, for example, AASM 108 does not include a local speech engine but rather relies on speech engine 113 of application server 111 for speech processing tasks.

Set reminder logic 222 includes computing logic/instructions embodied in software, hardware, or a combination thereof, configured to cooperate with SRS 220 to automatically set reminders in wireless communication device 102. Set reminder logic 222 can include data structures such as tables 302, 304 of FIG. 3. Table 302 includes a group of phrases 306 associated with corresponding date/time entries. Table 304 includes one or more functions 310 respectively associated with customizable configuration settings 312. The use of tables 302, 304 will be further detailed below with reference to FIG. 4. It is to be understood that while for purposes of example AASM 108 has been shown in FIG. 2, and described with reference thereto, as incorporating SRS 220 and set reminder logic 222, in other embodiments SRS 220 can be a stand alone module provided in some other component of wireless communication device 102. In some embodiments, it is even preferable to provide SRS 220 as an external application to wireless communication device 102, wherein the functionality of SRS 220 is provided by one or more devices of communications network 114. Similarly, although set reminder logic 222 is shown as separate from memory 218 in FIG. 2, in some embodiments, set reminder logic 222 is preferably stored in memory 218. Likewise, in certain embodiments, AASM 108 can be configured to communicate with processor 200 without necessarily having to interface first with memory 218.

Referencing FIG. 4 now, a method 400 that can be embodied in the computing programming logic/instructions of AASM 108 will be described. Following a start step (402), table 302 can be populated (404) with frequently used phrases 306 such as "I will call you tonight" and "I will call you later today." Each phrase 306 can be associated with a date/time item 308, which can be customizable. However, in some cases, date/time item 308 is empty or is designated as "timeless", meaning that there is no specific date/time to associate with a given phrase 306. In some embodiments, table 302 can be populated through textual input via keypad 208. In other embodiments, table 302 is populated via speech input that is processed by SRS 220. Data corresponding to phrases 306 can be stored as textual data or voice data, or any other suitable format for access and processing by SRS 220.

As part of start step (402), or subsequently thereafter, table 304 can be populated with configuration settings 312 for available functions 310. In one embodiment, table 304 includes configurable settings for blacklisted numbers, a location filter setting, and a time/day filter setting. In the example shown, a "location" filter provides that a reminder is set or accepted at any location except when wireless communication device 102 is located at a location designated as "home." A "time/day" filter of table 304 is configured so that a reminder is set only between the hours of 8 a.m. and 8 p.m., and the days Monday through Saturday. Table 304 can also specify certain external applications that AASM 108 can interface with to set reminders. In the example illustrated, Lotus Notes and Outlook are applications that AASM 108 can interface with to set reminders, in those applications, corresponding to the reminders set in wireless communication device 102. In certain embodiments, table 304 can include one or more phrases to be matched to a callee's speech (that is, data in a wireless mobile telephone transmission), which one or more phrases can be associated with a date/time to set a reminder. For example, if wireless communication device 102 detects the utterance "Please remind me to do" by a callee, a reminder is set in the wireless communication device 102 for the next day at 10:00 p.m.

The method 400 can include determining whether a user is on call (406), that is, whether a transmission is taking place via wireless communication device 102. If it is determined that a transmission is not taking place, the method 400 ends (422). However, if a transmission is taking place, the wireless communication device 102 records the transmission. In other embodiments, the transmission is not recorded in whole, but rather, wireless communication device 102 stores only so much of the voice data needed to perform real time analysis of the oral speech input to wireless communication device 102. The method 400 can include applying one or more filters (410). For example, using data from table 304, wireless communication device 102 determines whether a callee's number is a black listed number. If the callee's number is blacklisted, no reminder is set in response to any speech input of either the caller or the callee. When the callee's number is blacklisted, for example, the application of filters (410) results in "fail" and the method ends (422). If, on the other hand, the callee's number is not blacklisted, the application of that particular filter (410) passes and the method proceeds to a decision step (412). In some embodiments, several filters can be used. For example, referencing Table 304 of FIG. 3, a location filter can be used such that reminders are not set whenever a transmission originates from a certain location, such as a location identified as "home." By way of another example, a time/day filter can be used such that reminders are set only between 8 a.m. and 8 p.m, and/or only on Monday through Saturday. Any combination of such filters can be used, and some filters can be given priority over other filters.

After applying all the desired filters to the recorded transmission and passing the filtering process, AASM 110 determines whether the transmission is over (412). If the transmission is not over, process flow returns to recording the conversation (408). If AASM 110 determines that the transmission is over, the transmission data is compared (414) against the stored phrases 306 of table 302 and/or the callee phrases of table 304. In one embodiment, only the caller's speech input is analyzed, while in another embodiment only the callee's voice data is analyzed, and in yet other embodiments, both the caller's and callee's speech are analyzed. This step of the method can be performed by using SRS 220, for example. Assuming that the recorded transmission includes utterances that match one or more of the stored phrases 306, AASM 110 determines (416) whether the matched phrase 306 is associated with a specified date/time item 308. If the phrase 306 is associated with a date/time item 308 that is designated as a "timeless event" (in other words, an item that is not associated with a specified date/time), a reminder is set in a "to do" list (420), which to do list can be stored both locally in wireless communication device 102 and in an external application that interfaces with wireless communication device 102. If the phrase 306 is associated with a specified date/time item 308, a reminder with date/time is set (418) in wireless communication device 102 and/or in external applications listed in table 304. In a given day, if there are multiple duplicate events (for example, several "I will call you tonight" events), an option can be set to space the alert time by a given amount—say, 15 minutes. Thus, for example, the first event is set for 10 p.m., the second event is set for 10:15 p.m., and so on. The method 400 then ends (422). In some embodiments, method 400 can include a deletion of the recorded transmission before or as part of the end step.

Figure 4:
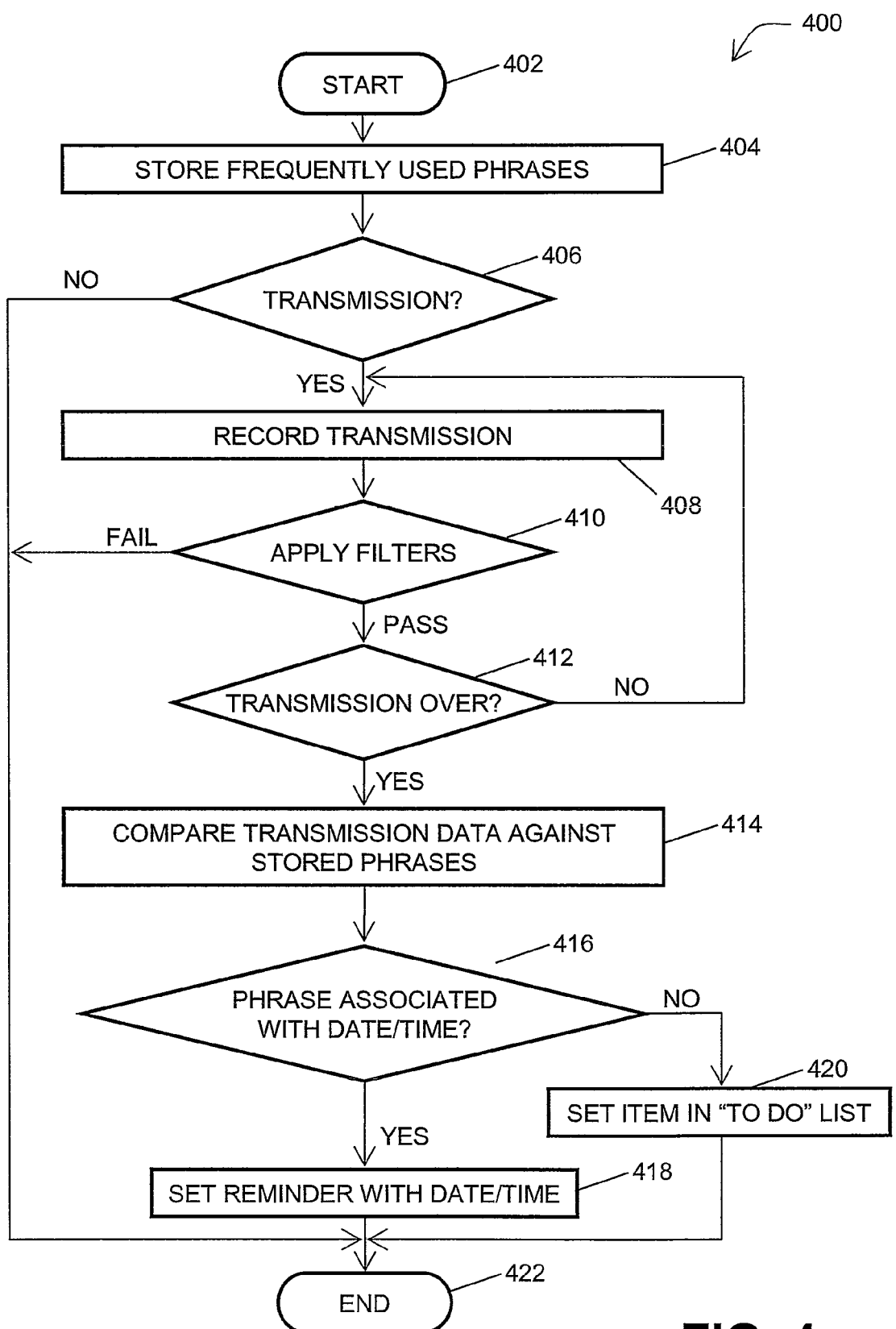
FIG. 4 is a flowchart illustrating an exemplary method that can be used with the wireless communication device of FIG. 2 for providing functionality for automatically setting reminders.

It should be noted that, in one embodiment, the reminders are set in real time as a transmission progresses, and query step "transmission over?" (412) can be performed after "set reminder with date/time" (418), rather than after step "apply filters" (410) as shown in FIG. 4. In other words, the method 400 can be reconfigured such that wireless communication device 102 processes a transmission as it happens and sets appropriate reminders, if applicable, rather than first recording the entire transmission and only setting the appropriate reminders after the transmission is over (as shown in FIG. 4).

In the flow charts and/or functional block diagrams above, one or more of the methods can be embodied in a computer writable and/or readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage media such as fixed (hard) drives, semiconductor memories such as ROMs, PROMs, etc., thereby making an article of manufacture in accordance with the invention. The article of manufacture containing the programming code is used by either executing the code directly from the storage device, or by copying the code from the storage device into another storage device such as a hard disk, RAM, etc. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of automatically setting reminders in a mobile communication device, the method comprising:
   during a voice conversation communicated between the mobile communication device and another communication device via a wireless communication link, the mobile communication device receiving an utterance of the voice conversation;
   in response to a speech recognition system detecting a match between the received utterance of the voice conversation and a stored phrase, the mobile communication device automatically setting a reminder in the mobile communication device;
   the mobile communication device recording the utterance; and
   the mobile communication device applying a white list filter, a blacklist filter, or a combination thereof, to a phone number of the another communication device;
   wherein the automatically setting comprises setting the reminder in the mobile communication device if the phone number is in a white list and not setting the reminder in the mobile communication device if the phone number is in a blacklist.

2. The method of claim 1, wherein:
   the method further comprises:
      the mobile communication device applying a location filter to the utterance; and
      the mobile communication device determining a location of the mobile communication device; and
   the automatically setting comprises automatically setting the reminder only if the mobile communication device is determined to be at a pre-specified location when receiving the utterance.

3. The method of claim 1, wherein:
   the method further comprises the mobile communication device applying a temporal filter to the utterance;
   the automatically setting is conditionally performed based on application of the temporal filter.

4. The method of claim 1, wherein the automatically setting the reminder comprises setting a reminder with a specific date or time.

5. The method of claim 1, wherein the automatically setting the reminder comprises entering an item in a "to do" list.

6. A wireless communication device having functionality for automatically setting reminders, the wireless communication device comprising:
   a processor,
   a memory coupled to the processor;
   one or more computer-readable tangible storage devices;
   a wireless network interface in communication with the processor, wherein the wireless network interface is configured to support a voice conversation between the wireless communication device and another communication device via a wireless communication link of a wireless network;
   a speech recognition system configured to detect, during the voice conversation, whether an utterance of the voice conversation between the mobile communication device and the another communication device via the wireless communication link matches a phrase among a plurality of stored phrases;
   programming code, stored on at least one of the one or more computer-readable tangible storage devices for execution by the processor via the memory, to automatically set a reminder in said wireless communication device in response to the speech recognition system detecting a match between the utterance and the phrase;
   programming code, stored on at least one of the one or more computer-readable tangible storage devices for execution by the processor via the memory, to record a plurality of utterances of the voice conversation in the memory; and
   programming code, stored on at least one of the one or more computer-readable tangible storage devices for execution by the processor via the memory, to apply a white list filter, a blacklist filter, or a combination thereof, to a phone number of the another communication device;
   wherein the programming code to automatically set the reminder sets the reminder if the phone number is in a white list and does not set the reminder if the phone number is in a blacklist.

7. The wireless communication device of claim 6, further comprising programming code, stored on at least one of the one or more computer-readable tangible storage devices for execution by the processor via the memory, to apply a location filter to the utterances, wherein the programming code to automatically set the reminder automatically sets the reminder only if the wireless communication device is determined to be at a location defined by the location filter.

8. The wireless communication device of claim 6, further comprising programming code, stored on at least one of the one or more computer-readable tangible storage devices for execution by the processor via the memory, to apply a temporal filter to the utterances, wherein the programming code to automatically set the reminder automatically sets the reminder conditionally based on application of the temporal filter.

9. The wireless communication device of claim 6, further comprising programming code, stored on at least one of the one or more computer-readable tangible storage devices for execution by the processor via the memory, to automatically set a reminder with a specific date/time.

10. The wireless communication device of claim 6, further comprising programming code, stored on at least one of the one or more computer-readable tangible storage devices for execution by the processor via the memory, to automatically enter a reminder item in a "to do" list.

11. A computer program product, comprising:
one or more computer-readable tangible storage devices;
programming code, stored on at least one of the one or more computer-readable tangible storage devices, to receive, in a wireless communication device, utterances of a voice conversation between said wireless communication device and another communication device that are communicated via a wireless communication link;
programming code, stored on at least one of the one or more computer-readable tangible storage devices, to detect during the voice conversation whether an utterance among the utterances matches a stored phrase;
programming code, stored on at least one of the one or more computer-readable tangible storage devices, in response to detecting a match between an utterance among the utterances and the stored phrase, to automatically set a reminder in said wireless communication device
programming code, stored on at least one of the one or more computer-readable tangible storage devices, to record the utterance; and
programming code, stored on at least one of the one or more computer-readable tangible storage devices, to apply a white list filter, a blacklist filter, or a combination thereof, to a phone number of the another communication device;

wherein the programming code to automatically set the reminder sets the reminder if the phone number is in a white list and does not set the reminder if the phone number is in a blacklist.

12. The computer program product of claim 11, further comprising programming code, stored on at least one of the one or more computer-readable tangible storage devices, to apply a location filter to the utterance; wherein the programming code to automatically set the reminder automatically sets the reminder is set only if the wireless communication device is determined to be at a pre-specified location when receiving the utterance.

13. The computer program product of claim 11, further comprising programming code, stored on at least one of the one or more computer-readable tangible storage devices, to apply a temporal filter to the utterance, wherein the programming code to automatically set the reminder automatically sets the reminder conditionally based on application of the temporal filter.

14. The computer program product of claim 11, wherein the programming code to automatically set the reminder sets a reminder with a specific date/time.

15. The computer program product of claim 11, wherein the programming code to automatically set the reminder enter an item in a "to do" list.

16. The method of claim 1, wherein the receiving comprises the mobile communication device receiving the utterance of the voice conversation from the another communication device via the wireless communication link.

17. The wireless communication device of claim 6, further comprising programming code, stored on at least one of the one or more computer-readable tangible storage devices for execution by the processor via the memory, to receive the utterance of the voice conversation in the mobile communication device from the another communication device via the wireless communication link.

18. The computer program product of claim 11, wherein the programming code to receive the utterances receives at least some of the utterances of the voice conversation from the another communication device via the wireless communication link.

\* \* \* \* \*